United States Patent
Götzenberger et al.

(10) Patent No.: US 12,017,551 B2
(45) Date of Patent: Jun. 25, 2024

(54) VEHICLE ON-BOARD ELECTRICAL SYSTEM HAVING A DC VOLTAGE CHARGING CONNECTION

(71) Applicant: Vitesco Technologies GmbH, Regensburg (DE)

(72) Inventors: Martin Götzenberger, Munich (DE); Reinhard Weinzierl, Munich (DE); Franz Pfeilschifter, Munich (DE)

(73) Assignee: Vitesco Technologies GmbH, Regensburg (DE)

( * ) Notice: Subject to any disclaimer, the term of this patent is extended or adjusted under 35 U.S.C. 154(b) by 176 days.

(21) Appl. No.: 17/615,260

(22) PCT Filed: Jun. 3, 2020

(86) PCT No.: PCT/EP2020/065313
§ 371 (c)(1),
(2) Date: Nov. 30, 2021

(87) PCT Pub. No.: WO2020/245170
PCT Pub. Date: Dec. 10, 2020

(65) Prior Publication Data
US 2022/0234457 A1    Jul. 28, 2022

(30) Foreign Application Priority Data

Jun. 4, 2019  (DE) ..................... 10 2019 208 118.5

(51) Int. Cl.
*B60L 53/22*   (2019.01)
*B60L 3/00*    (2019.01)
(Continued)

(52) U.S. Cl.
CPC ............. *B60L 53/22* (2019.02); *B60L 3/0069* (2013.01); *B60L 53/11* (2019.02); *B60L 53/16* (2019.02); *B60L 2210/10* (2013.01)

(58) Field of Classification Search
CPC ........ B60L 3/0069; B60L 50/12; B60L 53/11; B60L 53/14; B60L 53/16; B60L 53/22; B60L 2210/10
(Continued)

(56) References Cited

U.S. PATENT DOCUMENTS 7,880,326 B2   2/2011  Khan et al.
10,476,401 B2  11/2019  Kusch et al.
(Continued)

FOREIGN PATENT DOCUMENTS

DE    102006000796 A1   8/2006
DE    102015006208 A1   12/2015
(Continued)

OTHER PUBLICATIONS

German Examination Report for German Application No. 10 2019 208 118.5, dated Jun. 26, 2020 with machine translation, 19 pages.
(Continued)

*Primary Examiner* — Hal Kaplan
(74) *Attorney, Agent, or Firm* — Buchanhan Ingersoll & Rooney

(57) ABSTRACT

A vehicle on-board electrical system is equipped with a DC voltage charging connection, a non-configurable accumulator, a galvanically isolating DC-DC voltage converter, and an electrical drive. The accumulator is connected to a first side of the DC-DC voltage converter via a switchable connection circuit to which a DC voltage charging connection is connected. The accumulator is connected to the electrical drive and a second side of the DC-DC voltage converter via a drive switch. The connection circuit has a direct connection switch that connects the accumulator to the first side of the DC-DC voltage converter in a switchable manner. The DC voltage charging connection is connected
(Continued)

to the direct connection switch via a charging connection switch of the connection circuit.

12 Claims, 2 Drawing Sheets

(51) Int. Cl.
    *B60L 53/10*     (2019.01)
    *B60L 53/16*     (2019.01)

(58) Field of Classification Search
    USPC .................................................. 307/9.1, 10.1
    See application file for complete search history.

(56) References Cited

U.S. PATENT DOCUMENTS

| | | | |
|---|---|---|---|
| 11,097,626 B2* | 8/2021 | Pfeilschifter | ........... B60L 53/20 |
| 2006/0187015 A1 | 8/2006 | Canfield | |
| 2012/0139491 A1 | 6/2012 | Eberhard et al. | |
| 2015/0183329 A1* | 7/2015 | Nakaya | ................... H02S 40/34 |
| | | | 307/51 |
| 2018/0074108 A1 | 3/2018 | Dulle et al. | |
| 2019/0070971 A1 | 3/2019 | Kusumi et al. | |
| 2020/0180453 A1 | 6/2020 | Pfeilschifter et al. | |

FOREIGN PATENT DOCUMENTS

| | | |
|---|---|---|
| DE | 102016212543 A1 | 1/2018 |
| DE | 102016218304 B3 | 2/2018 |
| DE | 202018001504 U1 | 4/2018 |
| DE | 102017213682 A1 | 2/2019 |
| JP | 2017135802 A | 8/2017 |
| WO | 2013160031 A1 | 10/2013 |

OTHER PUBLICATIONS

International Search Report and Written Opinion for International Application No. PCT/EP2020/065313, dated Aug. 26, 2020, 8 pages.

International Search Report and Written Opinion for International Application No. PCT/EP2020/065313, dated Aug. 26, 2020, 13 pages (German).

Korean Notice to Submit Response for Application No. 10-2021-7043392, dated Oct. 27, 2023 with translation, 11 pages.

Office Action (The First Office Action) issued Jan. 24, 2024, by the State Intellectual Property Office of People's Republic of China in corresponding Chinese Patent Application No. 202080041256.0 and an English translation of the Office Action. (17 pages).

\* cited by examiner

# VEHICLE ON-BOARD ELECTRICAL SYSTEM HAVING A DC VOLTAGE CHARGING CONNECTION

CROSS REFERENCE TO RELATED APPLICATIONS

This application is the U.S. National Phase Application of PCT International Application No. PCT/EP2020/065313, filed Jun. 3, 2020, which claims priority to German Patent Application No. 10 2019 208 118.5, filed Jun. 4, 2019, the contents of such applications being incorporated by reference herein.

FIELD OF THE INVENTION

The invention is directed to a vehicle on-board electrical system.

BACKGROUND OF THE INVENTION

It is known practice to equip vehicles with an electrical drive that is supplied with power by an accumulator in the vehicle. The vehicle is equipped with a charging connection to charge the accumulator. The on-board electrical system of the vehicle has a high-voltage branch since, to reach high powers, the electrical drive and therefore also the accumulator preferably have a high operating voltage. For example, accumulators with a nominal voltage of 400 V are used, wherein these accumulators are referred to as high-voltage accumulators.

Furthermore, there are filter capacitances (also known as Cy capacitors) between the high-voltage potentials of the accumulators, on the one hand, and the ground potential, on the other hand. These are used to dissipate interference that is generated, for instance, by connected components. These filter capacitances should be taken into account when considering the risk of an electric shock. The document DE 10 2015 006 208 A1 describes the fact that accumulators can be divided up and parts of the accumulator can be operated in series, wherein, in the case of a nominal voltage of 400 V for each part of the accumulator, voltages of 800 V can arise on the filter capacitances.

SUMMARY OF THE INVENTION

It is an aim to indicate one possibility, with which vehicle components can be operated at high voltage in a simple manner without it being possible for excessively high filter capacitances to lead to a dangerous electric shock in the event of faulty insulation.

A vehicle on-board electrical system is proposed that has a DC voltage charging connection, a non-configurable accumulator, a galvanically isolating DC-DC voltage converter and an electrical drive. The non-configurable accumulator has cells that are connected (in series) with one another without switches. Therefore, a constant nominal voltage results and, in the absence of switches, there is therefore also no possibility of setting different nominal voltages (configurations) of the accumulator by way of a configurable arrangement of the cells. On the other hand, no additional switches are necessary to configure the accumulator. In this case, the galvanically isolating DC-DC voltage converter enables potential isolation between the DC voltage charging connection and numerous Cy capacitances. There is therefore only a low Cy capacitance (that is to say a low capacitance between the voltage potentials of the accumulator, on the one hand, and the ground potential, on the other hand) for the DC voltage charging connection.

It is provided for the DC voltage connection to be connected to the DC-DC voltage converter via a first switch, and for the accumulator to be connected to the DC-DC voltage converter via a second switch. In particular, the DC voltage charging connection and the accumulator are connected to the same side of the DC-DC voltage converter via respective switches. Each of the two switches has a first side that is directly connected to the DC-DC voltage converter. The second side of the first switch is connected to the DC voltage charging connection and the second side of the second switch is connected to the accumulator. The two switches therefore have a first side on which they are connected to one another (and also to the DC-DC voltage converter) and have a second side that is connected only to the DC voltage charging connection or only to the accumulator. The switch between the accumulator and the DC-DC voltage converter is also referred to as a direct connection switch. The switch between the DC voltage charging connection and the DC-DC voltage converter can be referred to as a charging connection switch or can also correspond to the isolating switch described below. A direct connection between the switches and the DC-DC voltage converter denotes switch-free connections that do not have a converter or that have a further converter. As viewed from the DC-DC voltage converter, there can therefore be a forking out into two paths, wherein the first path leads to the DC voltage charging connection via the first converter and the second path leads to the accumulator via the second switch. The switches described here are preferably bipolar and, when they are open, disconnect the two supply potentials.

A switchable connection circuit that is connected to the first side of the DC-DC voltage converter is provided. A DC voltage charging connection is connected to this connection circuit. This switchable connection circuit also comprises a charging connection switch. The accumulator is connected to the electrical drive and a second side of the DC-DC voltage converter via a drive switch (preferably not part of the connection circuit). In particular, a first path of the drive switch leads to the electrical drive and a second path leads to the second side of the DC-DC voltage converter. As viewed from the drive switch, there is therefore a forking out into two paths, wherein a first path leads to the electrical drive and a second path leads to the second side of the DC-DC voltage converter.

The connection circuit has a direct connection switch that connects the accumulator to the first side of the DC-DC voltage converter in a switchable manner. The DC voltage charging connection is connected to the direct connection switch via a charging connection switch of the connection circuit. There is therefore a first connection point that is connected to the galvanically isolating DC-DC voltage converter without switches. Starting from this first connection point, there is a branch via the direct connection switch, via which the accumulator is connected (to the DC-DC voltage converter), and a further branch to the DC voltage charging connection, wherein the DC voltage charging connection is connected to the DC-DC voltage converter (without switches) via the charging connection switch. A switchless connection does not rule out a connection to a converter; any switching elements in a converter should in this case not be considered to be the switches mentioned here.

There is a path from the DC-DC voltage converter (or the first side thereof) to the DC voltage charging connection via the charging connection switch and to the accumulator via the direct connection switch. A further path leads from the accumulator to the DC-DC voltage converter or the second side thereof via the drive switch. The electrical drive, and possibly further consumers or components of the vehicle on-board electrical system, are connected to the second side of the DC-DC voltage converter. The accumulator can be galvanically isolated from the second side of the DC-DC voltage converter by means of the drive switch, with the result that the accumulator is only galvanically connected to the DC voltage charging connection via the direct connection switch and the charging connection switch. Furthermore, although the second side of the DC-DC voltage converter is connected to the charging connection in a power-transmitting manner, there is no galvanic connection through this path. For this reason, the DC-DC voltage converter on the one hand, and the drive switch on the other hand, isolate the DC voltage charging connection from filter capacitances that are galvanically connected to the second side of the DC-DC voltage converter (for instance Cy capacitances on the electrical drive or other components).

Furthermore, energy can be fed in via the DC-DC voltage converter starting from the DC voltage charging connection, while the galvanically non-isolating connection can be transmitted energy from the DC voltage charging connection to the accumulator via the direct connection switch and the charging connection switch. In a first variant, there is no further switch, and in particular no further DC-DC voltage converter, provided between the galvanically isolating DC-DC voltage converter and the direct connection switch. In a further variant, provision is made for a galvanically non-isolating connection converter (also in the form of a DC-DC voltage converter) to be provided between the galvanically isolating DC-DC voltage converter and the DC voltage charging connection. Said connection converter is located between a switch, connected downstream of the DC voltage charging connection, and the galvanically isolating DC-DC voltage converter (or the direct connection switch).

The charging connection switch of the connection circuit can be connected to that side of the direct connection switch that is connected to the DC-DC voltage converter.

Provision can be made for a control device (of the vehicle on-board electrical system) to be connected to the switches in an actuating manner. In a DC charging mode (corresponding to a DC voltage charging mode), the control device is configured to actuate the charging connection switch in a closed state, to actuate the direct connection switch in an open state and to actuate the drive switch in a closed state. The control device is therefore designed to actuate the second switch in the closed state and to actuate the first switch in the open state if the DC charging mode is provided. In a driving mode, the control device is configured to actuate the charging connection switch (corresponding to the second switch) and the direct connection switch (corresponding to the first switch) in an open state. In the driving mode state, the drive switch is actuated in a closed state. This is provided by the control device. The control device is configured to be operated in a driving mode and in a DC charging mode.

In one variant, the charging connection switch of the connection circuit is connected to that side of the direct connection switch that is connected to the accumulator. This corresponds to the first side of the galvanically isolating DC-DC voltage converter. The connection circuit can also have a galvanically connecting connection converter. This is in the form of a DC-DC voltage converter, but is only referred to as a connection converter to clearly distinguish it from the galvanically isolating DC-DC voltage converter. Only its function corresponds to that of a DC-DC voltage converter. The DC voltage charging connection is connected via the connection converter to that side of the direct connection switch that is connected to the DC-DC voltage converter. In this variant, there is an alternative charging connection switch that is provided between the DC voltage charging connection and the accumulator and is therefore connected to that side of the direct connection switch that is averted from the DC-DC voltage converter. In variants presented above, the charging connection switch is connected to that side of the direct connection switch that is facing the DC-DC voltage converter. In the variant described here, there is a further connection from the DC voltage charging connection to the connection converter via an additional switch (that is also referred to as an isolating switch). In this case, the connection converter connects the isolating switch to the galvanically isolating DC-DC voltage converter or to the first side thereof. In particular, the connection converter connects the isolating switch (that leads to the DC voltage charging connection) to the direct connection switch that in turn connects the connection converter to the accumulator. A DC voltage can therefore be transmitted from the DC voltage charging connection to the accumulator via the connection converter without galvanically non-isolated connections to the Cy capacitors of the electrical drive resulting in this case.

In a further charging mode, the charging connection switch can be closed, with the result that the DC voltage charging connection is directly connected (i.e. not via the connection converter) to the accumulator via the charging connection switch, in particular not via the direct connection switch. During charging, the drive switch is preferably open, with the result that there is galvanic isolation between the Cy capacitors of the electrical drive and the DC voltage charging connection firstly by way of the drive switch and by way of the galvanically isolating DC-DC voltage converter. It is also not necessary for the accumulator to have to be configured between different nominal voltages, and rather it can have a fixed nominal voltage and therefore an unchangeable configuration. The accumulator can generally be charged by the DC voltage charging connection via the direct connection switch (first switch) (wherein the drive switch is open so as not to connect the Cy capacitors of the electrical drive to the DC voltage charging connection). When the direct connection switch is open, the accumulator can also be charged via the galvanically isolating DC-DC voltage converter and the drive switch that is then closed. These two possibilities allow an adaptation to the operating voltage of the accumulator that is changing with the state of charge of the accumulator. At the same time, it is possible to charge the accumulator via the galvanically isolating DC-DC voltage converter, in particular in the case of a low state of charge, without having to reconfigure the accumulator. Furthermore, it is possible for further components to be operated by means of the second side of the galvanically isolating DC-DC voltage converter; in this case the drive switch makes it possible to galvanically separate the Cy capacitors from the DC voltage charging connection.

In this case, the controller can be designed for (at least) two different charging modes, wherein a first charging mode runs via the galvanically isolating DC-DC voltage converter, and the other mode via a switch that directly connects the accumulator to the DC voltage charging connection. In addition, an AC voltage charging mode can be provided.

In part, the DC voltage charging connection is connected to the connection converter via an isolating switch. The vehicle on-board electrical system is configured to provide the isolating switch in the closed state only in a DC charging mode. If there are a plurality of DC charging modes, then the isolating switch can be closed in one of the charging modes and can be closed or open in another DC charging mode.

The galvanically isolating DC-DC voltage converter is preferably configured to convert a first high voltage to a second high voltage. The high voltage present on the second side of the galvanically isolating DC-DC voltage converter is preferably higher than the other high voltage. In particular, the galvanically isolating DC-DC voltage converter can be configured to step up a voltage from the first side to the second side. In particular, the galvanically isolating DC-DC voltage converter can be configured to convert a voltage of 400 volts on the first side to a voltage of 800 volts on the second side. These voltage values are purely exemplary and in particular can deviate by at least 10% or 25% from the numerical values mentioned.

A single-phase or multiphase AC voltage charging connection can also be provided. The AC voltage charging connection of the vehicle on-board electrical system is preferably connected to the first side of the galvanically isolating DC-DC voltage converter via a power factor correction filter of the vehicle on-board electrical system. In particular, the AC voltage charging connection is connected to the first connection point or to the direct connection switch via the power factor correction filter. The AC voltage connection is therefore connected to the accumulator via the power factor correction filter the direct connection switch that is connected downstream of the power factor correction filter. If a connection converter is provided, the AC voltage charging connection can also be connected to the connection converter via the power factor correction filter, which connection converter in turn leads to the DC voltage charging connection via the isolating switch. The switch, which is likewise provided, between the accumulator and the DC voltage charging connection is open, preferably in the same way as the isolating switch mentioned, if AC voltage is being used for charging.

Instead of the power factor correction filter, another rectifying component can also be provided, for example a rectifier that does not have a step-up or step-down function.

The vehicle on-board electrical system can also have a DC link capacitor circuit. This is connected to the first side of the galvanically isolating DC-DC voltage converter. The DC link capacitor circuit can have a plurality of capacitors that are configurable. In other words, the DC link capacitor circuit can be configurable and can have a plurality of capacitors that are connected selectably (by means of a switchable configuration circuit) in parallel or in series with one another. In this case, appropriate switches connect the capacitors in parallel in a first configuration state and in series in a second configuration state.

The electrical drive is connected to the second side of the galvanically isolating DC-DC voltage converter. In this case, the second side of the galvanically isolating DC-DC voltage converter can represent an on-board electrical system branch to which the electrical drive is connected, which can, however, also form part of this on-board electrical system branch. Instead of, or in combination with, the electrical drive, one or more further components can be connected to the second side of the galvanically isolating DC-DC voltage converter. The second side of the galvanically isolating DC-DC voltage converter is connected to at least one further component in this case. The components can be in the form of an electrical heating device for the interior, an electrical heating device for a thermal circuit (for instance, on the power electronics and/or of the electrical drive) or for an exhaust gas aftertreatment device. The further components can also be in the form of an electrical air-conditioning compressor, an inductive charging unit or a low-voltage DC-DC voltage converter. Further components can adjoin the low-voltage DC-DC voltage converter; in particular, a low-voltage on-board electrical system branch can adjoin the low-voltage DC-DC voltage converter. A further component, that is formed as above, can adjoin the galvanically isolating DC-DC voltage converter (in particular the second side thereof). If a plurality of components are connected to the second side of the galvanically isolating DC-DC voltage converter, these can be of similar design and formed as described above, or can be formed differently, as described above.

A discharge device can also be connected to the second side of the galvanically isolating DC-DC voltage converter. The discharge device is part of the vehicle on-board electrical system in this case. In particular, the discharge device discharges DC link capacitors and/or Cy capacitors (between ground and a supply potential). In particular, the discharge circuit can be configured to discharge a capacitance between two supply potentials.

In addition, in one embodiment, the accumulator can be arranged in a first housing, the drive switch, the direct connection switch and the charging connection switch (optionally also the isolating switch and the connection converter) can be arranged in a second housing and the galvanically isolating DC-DC voltage converter can be arranged in a third housing.

DETAILED DESCRIPTION OF THE PREFERRED EMBODIMENTS

Figure 1:
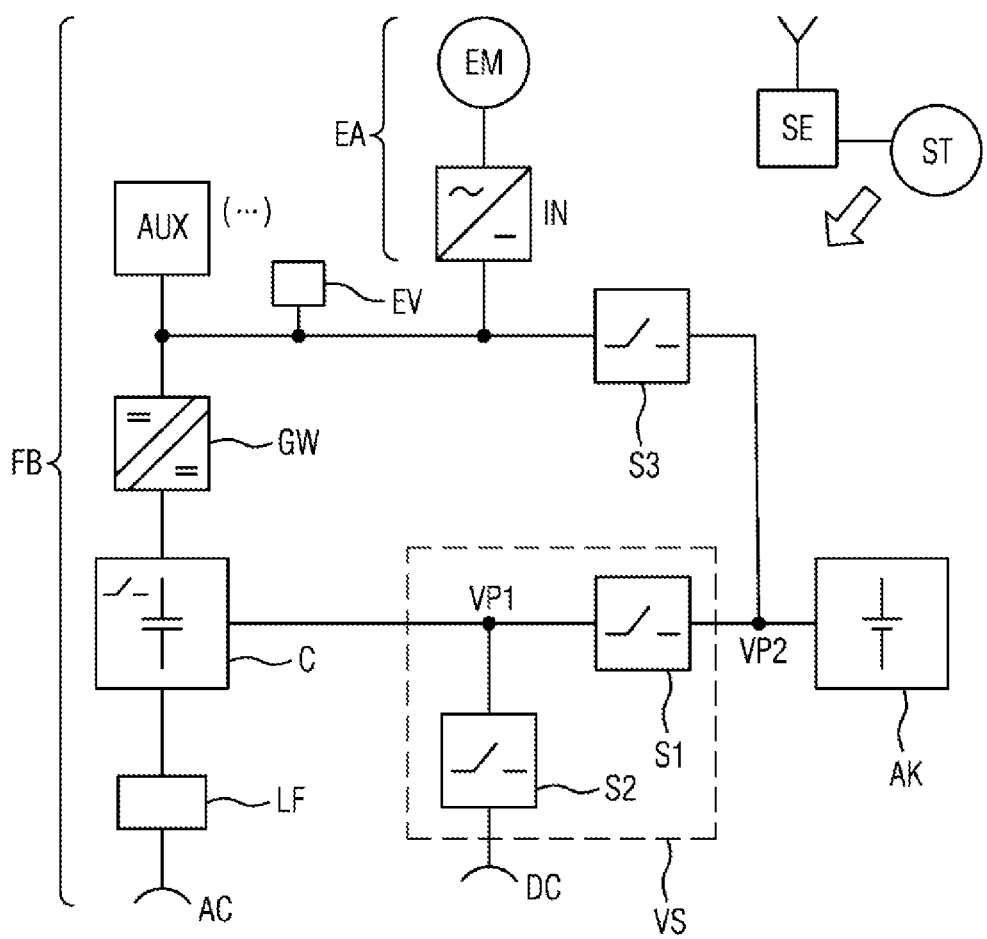
FIGS. 1 and 2 show, by way of example, a plurality of possibilities for implementing a vehicle on-board electrical system described herein.

FIG. 1 shows a vehicle on-board electrical system FB having a galvanically isolating DC-DC voltage converter GW. The vehicle on-board electrical system FB also comprises an accumulator AK. The accumulator AK is connected to the DC-DC voltage converter GW, in particular to the first side thereof, via the direct connection switch S1. The accumulator is also connected to a second side of the galvanically isolating DC-DC voltage converter GW via the drive switch S3. Further components (illustrated symbolically as AUX) and an electrical drive EA are also connected to the second side of the galvanically isolating DC-DC voltage converter GW. The electrical drive EA comprises an electrical machine EM that is connected to the second side of the galvanically isolating DC-DC voltage converter GW via the inverter IN. The switches S1 and S2 meet at a first connection point VP1. A second connection point VP2 is a point at which the switches S1 and S3 meet. The switch S1 is therefore connected between the first connection point VP1 and the second connection point VP2.

The DC voltage charging connection DC is connected to the first side of the DC-DC voltage converter GW via the switch S2 (and the first connection point VP1). Together, the switches S1 and S2 form the connection circuit VS. The galvanically isolating DC-DC voltage converter GW is therefore connected both to the DC voltage charging connection DC and to the accumulator AK via the switchable connection circuit VS.

Changeover or configuration of the accumulator can be avoided, wherein the DC-DC voltage converter GW provides galvanic isolation to thus avoid an electric shock if there are insulation faults. Provision is furthermore made for an AC voltage charging connection AC to be connected to the first side of the galvanically isolating DC-DC voltage converter GW via a power factor correction filter LF (for example in the form of a Vienna filter), so as to therefore also enable an AC voltage level. Configurable DC link capacitors C are connected to the first side of the DC-DC voltage converter GW. The DC link capacitors C can be connected in parallel or in series with one another so as to therefore set a high total capacitance or a high voltage loading capacity in a switchable manner. Initially, it is preferable for the switch S1 to be opened and the switch S2 to be closed. This is carried out when charging is to be performed or a controller ST is in a charging mode (in particular a DC voltage charging mode). The controller ST is connected to the switches S1 to S3 illustrated in FIG. 1, in particular also to switches of the DC link capacitor circuit C, in an actuating manner.

The controller ST can open the switch S1 and close the switch S2 to prepare for the charging mode. The DC link capacitor circuit can then be changed to a parallel state (by the controller ST), in which case DC link capacitors are connected in parallel with one another. Provision is made for the DC-DC voltage converter to then convert the voltage present on the first side and transmit it to the accumulator via the switch S3 that is then to be closed. Provision is therefore made for the switch S3 to be closed following the parallel configuration of the DC link capacitor circuit C.

According to one variant, the vehicle on-board electrical system comprises a transmitter SE that can communicate with an (external) DC voltage charging station and is configured, during charging, to set the voltage of the charging station to an invariable voltage, for example to essentially 400 volts. The galvanically isolating DC-DC voltage converter GW adjusts the charging voltage.

A discharge device EV on the second side of the galvanically isolating DC-DC voltage converter is used for discharging and can be activated in particular upon completion of the charging operation.

Figure 2:
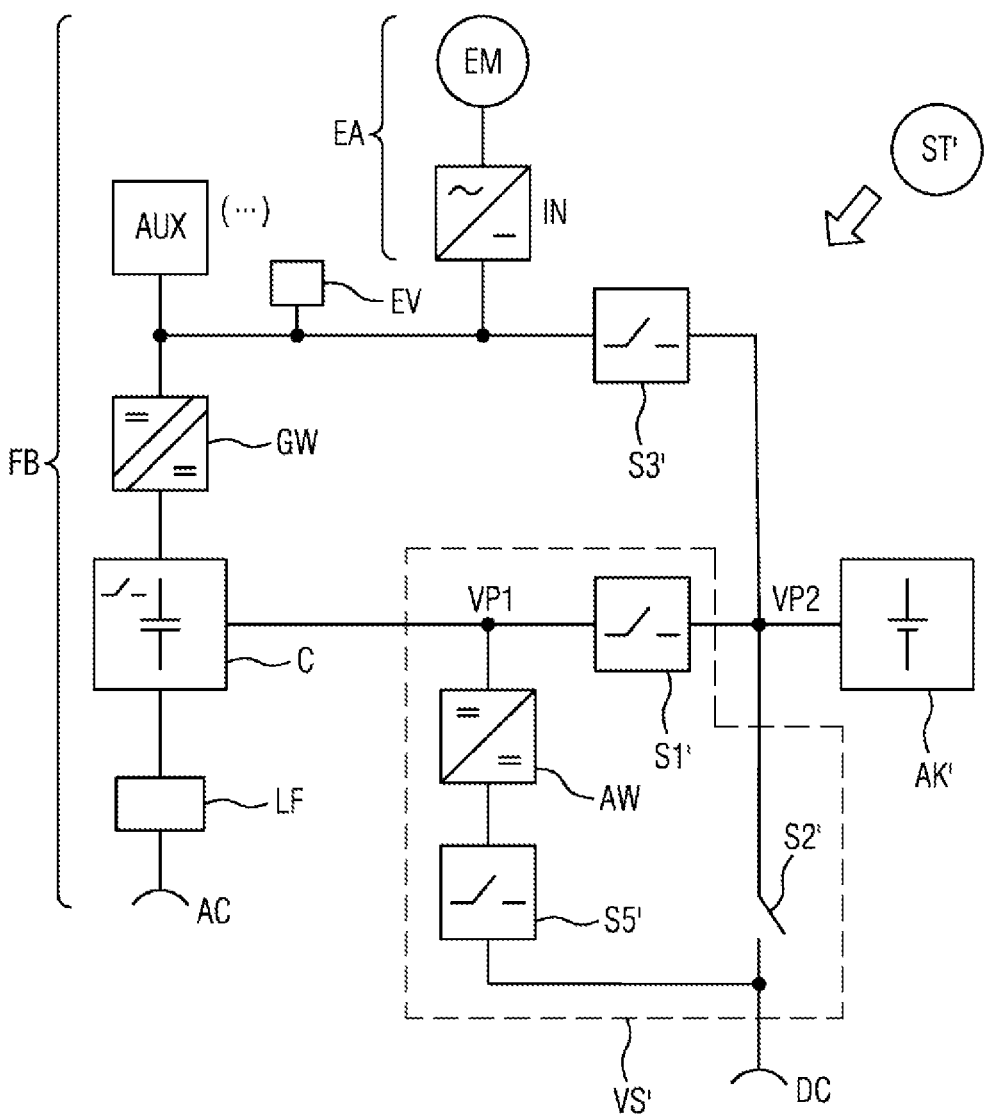

FIG. 2 shows a further vehicle on-board electrical system with components that correspond to the components in FIG. 1 and differ only by an apostrophe in the reference sign. This applies in particular to all the reference signs in FIG. 2, apart from S2' and VS'.

FIG. 2 shows a vehicle on-board electrical system FB having a DC voltage charging connection DC that is directly connected (in contrast to FIG. 1) to the accumulator or the second connection point VP2 via a charging connection. In comparison to FIG. 1, it is apparent that there the switch S2 is directly connected to the connection point VP1 and therefore indirectly connected to the accumulator AK via the switch S1, whereas, in FIG. 2, the switch S2' connects the DC voltage charging connection DC to the second connection point VP2 and therefore directly connects the DC voltage charging connection DC to the accumulator AK'. This is different from the variant of FIG. 1.

The vehicle on-board electrical system FB of FIG. 2 therefore also comprises a switchable connection circuit VS' that comprises the charging connection switch S2', the direct connection switch S1' and the first connection point VP1. A connection converter AW is connected to the first connection point and is in turn connected to the DC voltage connection DC (without a further switch) via an isolating switch S5'. The connection converter AW is galvanically non-isolating and has the function of a DC-DC voltage converter. The DC voltage charging connection DC is directly connected to the accumulator AK' via the switch S2'. The DC voltage charging connection DC is connected to the second side of the DC-DC voltage converter GW via the switch S5' and the connection converter AW connected downstream of the switch. The direct connection switch S1' is situated between the connection converter AW and the accumulator.

Otherwise, the vehicle on-board electrical system of FIG. 2 also has an electrical drive EA as well as further components AUX that are connected to the second side of the DC-DC voltage converter GW and are galvanically isolated from the accumulator as a result, provided the switch S3' is open. In this case, the switch S3' connects the second side of the galvanically isolating DC-DC voltage converter GW to the accumulator AK' or to the second connection point VP2. In this case too, the electrical drive comprises an electrical machine EM that is connected to the second side of the galvanically isolating DC-DC voltage converter GW via an inverter IN. The second side of the DC-DC voltage converter GW is therefore connected to the accumulator via the switch S3', whereas the connection between the accumulator and the first side of the DC-DC voltage converter GW can be broken via the direction connection switch S1'. In this case, the switch S2' is also used for disconnection, in particular for disconnection of the DC voltage charging connection DC from the accumulator. There is however a further connection via the switch S5' from the DC voltage charging connection DC to the first side of the DC-DC voltage converter GW via the connection converter AW. The first side of the DC-DC voltage converter is connected to a configurable DC link capacitor circuit C. Here, as in FIG. 1, there are DC link capacitors that can be designed to be able to be connected to one another in parallel or in series.

An exchangeable voltage charging connection AC is connected to the first side of the DC-DC voltage converter GW via a power factor correction filter LF.

The controller ST is used for actuating the switches illustrated in FIG. 2 and for configuring the DC link capacitor circuit C.

For DC voltage charging, in particular at 400 volts, the switch S5' is closed, wherein the connection converter AW steps up this voltage. In this case, the connection converter AW is designed as a step-up converter that implements step-up conversion from the DC voltage charging connection DC to the galvanically isolating DC-DC voltage converter GW. The switch S2' is open. The switch S1' is closed. During this charging state, the DC link capacitor circuit is in series mode, that is to say that the capacitors located there are connected in series with one another. As a result, the DC link capacitor circuit can process a higher operating voltage than in the case of a parallel configuration. The switch S3' is preferably open. As a result, energy can be introduced into the accumulator AK' by the DC voltage charging connection DC via the switch S5', the connection converter AW and the switch S1'. At the same time, the open switch S3' ensures that the Cy capacitors are galvanically separated from the accumulator AK' or, in particular, from the DC voltage charging connection DC. The galvanically isolating DC-DC voltage converter GW is used here to supply the components AUX with power and can therefore be designed with a lower power than the connection converter.

According to the variants of FIG. 1 and FIG. 2, the switch S3 or S3' can be closed for driving, with the result that the accumulator AK, AK' can supply the electrical drive EA with power.

While the charging energy is passed via the DC-DC voltage converter GW in FIG. 1, the example in FIG. 2 provides for the connection converter AW to deliver the energy from the DC voltage charging connection DC to the accumulator AK'; power transmitted via the DC-DC voltage converter GW is not passed on to the accumulator on account of the open switch S3' in FIG. 2.

The invention claimed is:

1. A vehicle on-board electrical system comprising:
a DC voltage charging connection;
a non-configurable accumulator;
a galvanically isolating DC-DC voltage converter;
an electrical drive;
a power factor correction filter; and
an AC voltage charging connection connected to a first side of the galvanically isolating DC-DC voltage converter via the power factor correction filter,
wherein the accumulator is connected to the first side of the DC-DC voltage converter via a switchable connection circuit to which a DC voltage charging connection is connected, and the accumulator is connected to the electrical drive and a second side of the DC-DC voltage converter via a drive switch,
wherein the connection circuit has a direct connection switch that connects the accumulator to the first side of the DC-DC voltage converter in a switchable manner and the DC voltage charging connection is connected to the direct connection switch via a charging connection switch of the connection circuit.

2. The vehicle on-board electrical system as claimed in claim 1, wherein the charging connection switch of the connection circuit is connected to the side of the direct connection switch that is connected to the DC-DC voltage converter.

3. The vehicle on-board electrical system as claimed in claim 2, further comprising a control device that is connected to the switches in an actuating manner, is configured, in a DC charging mode, to actuate the charging connection switch in a closed state, to actuate the direct connection switch in an open state and to actuate the drive switch in a closed state, and is configured, in a driving mode, to actuate the charging connection switch and the direct connection switch in an open state and to actuate the drive switch in a closed state.

4. The vehicle on-board electrical system as claimed in claim 1, wherein the charging connection switch of the connection circuit is connected to the side of the direct connection switch that is connected to the accumulator, and the connection circuit also has a galvanically connecting connection converter that is in the form of a DC-DC voltage converter, and the DC voltage charging connection is connected via the connection converter to the side of the direct connection switch that is connected to the DC-DC voltage converter.

5. The vehicle on-board electrical system as claimed in claim 4, further comprising a control device that is connected to the switches in an actuating manner, is configured, in a DC charging mode, to actuate the charging connection switch in an open state, to actuate the direct connection switch in a closed state and to actuate the drive switch in an open state, and is configured, in a driving mode, to actuate the charging connection switch and the direct connection switch in an open state and to actuate the drive switch in a closed state.

6. The vehicle on-board electrical system as claimed in claim 4, wherein the DC voltage charging connection is connected to the connection converter via an isolating switch, wherein the vehicle on-board electrical system is configured to provide the isolating switch in a closed state only in a DC charging mode.

7. The vehicle on-board electrical system as claimed in claim 1, wherein the galvanically isolating DC-DC voltage converter is configured to convert a first high voltage to a second high voltage, and the high voltage present on the second side of the galvanically isolating DC-DC voltage converter is the higher of the two high voltages.

8. The vehicle on-board electrical system as claimed in claim 1, further comprising a DC link capacitor circuit that has a plurality of capacitors that are selectably connected in parallel or in series with one another.

9. The vehicle on-board electrical system as claimed in claim 1, wherein at least one further component is connected to the second side of the galvanically isolating DC-DC voltage converter, wherein the at least one further component is in the form of:
an electrical heating device for an interior, for a thermal circuit or for an exhaust gas aftertreatment device,
an electrical air-conditioning compressor,
an inductive charging unit, or
a low-voltage DC-DC voltage converter with a connected low-voltage on-board electrical system branch.

10. The vehicle on-board electrical system as claimed in claim 1, wherein a discharge device is connected to the second side of the galvanically isolating DC-DC voltage converter.

11. The vehicle on-board electrical system of claim 1, wherein the accumulator is arranged in a first housing, the drive switch, the direct connection switch and the charging connection switch are arranged in a second housing and the galvanically isolating DC-DC voltage converter is arranged in a third housing.

12. The vehicle on-board electrical system as claimed in claim 5, wherein the DC voltage charging connection is connected to the connection converter via an isolating switch, wherein the vehicle on-board electrical system is configured to provide the isolating switch in a closed state only in a DC charging mode.

* * * * *